United States Patent [19]

Ziemelis et al.

[11] Patent Number: 4,898,913

[45] Date of Patent: Feb. 6, 1990

[54] METHOD OF MAKING HYDROPHOBIC COPOLYMERS HYDROPHILIC

[75] Inventors: Maris J. Ziemelis; William R. R. Park, both of Midland, Mich.

[73] Assignee: Dow Corning Corporation, Midland, Mich.

[21] Appl. No.: 334,501

[22] Filed: Apr. 7, 1989

[51] Int. Cl.$^4$ .................... C08F 267/02; C08F 265/02
[52] U.S. Cl. ..................................... 525/301; 525/293; 525/311; 525/902
[58] Field of Search ................. 525/293, 301, 902, 311

[56] References Cited

U.S. PATENT DOCUMENTS

| | | | |
|---|---|---|---|
| Re. 27,026 | 1/1971 | Alfrey et al. | 260/2.5 |
| 2,809,943 | 10/1957 | Pye et al. | 260/2.1 |
| 3,418,262 | 12/1968 | Werotte et al. | 260/2.2 |
| 3,509,078 | 4/1970 | Roubinek et al. | 260/2.5 |
| 3,627,708 | 12/1971 | Morse et al. | 260/2.5 |
| 3,637,535 | 1/1972 | Corte et al. | 260/2.1 |
| 3,767,600 | 10/1973 | Albright | 260/2.2 |
| 3,892,822 | 7/1975 | Frechtling | 525/301 |
| 3,989,649 | 11/1976 | Kailto et al. | 260/2.1 |
| 4,208,309 | 6/1980 | Kraemer et al. | 260/8 |
| 4,224,415 | 9/1980 | Meitzner et al. | 521/38 |
| 4,661,327 | 4/1987 | Horton | 423/7 |
| 4,690,825 | 9/1987 | Won | 424/501 |
| 4,724,240 | 2/1988 | Abrutyn | 514/847 |

FOREIGN PATENT DOCUMENTS

| | | |
|---|---|---|
| 1168157 | 5/1984 | Canada . |
| 0252463 | 1/1988 | European Pat. Off. . |
| 2608533 | 9/1976 | Fed. Rep. of Germany . |
| WO88/01164 | 2/1988 | PCT Int'l Appl. . |

Primary Examiner—Joseph L. Schofer
Assistant Examiner—T. McDonald, Jr.
Attorney, Agent, or Firm—Jim L. DeCesare

[57] ABSTRACT

A method for altering a macroporous cross-linked hydrophobic copolymeric lattice produced by precipitation polymerization in a solvent of at least one monounsaturated ester monomer and at least one polyunsaturated ester monomer soluble therein, in order to render the hydrophobic copolymeric lattice hydrophilic. The method involves saponifying the hydrophobic copolymeric lattice by reacting the surface of the hydrophobic copolymeric lattice with an aqueous alkali. The surface can also be rendered hydrophilic by polymerizing an acrylate monomer onto the lattice in order to form a surface containing carboxylic acid sites. The carboxylic acid sites formed on the surface of the lattice are converted to carboxylate anions.

11 Claims, No Drawings

METHOD OF MAKING HYDROPHOBIC COPOLYMERS HYDROPHILIC

BACKGROUND OF THE INVENTION

This invention relates to a method for altering the surface of a macroporous cross-linked hydrophobic copolymeric lattice in order to render the lattice hydrophilic. Two mechanisms for accomplishing this surface alteration are provided, along with copolymers produced by both mechanisms. One mechanism relates to the saponification of the surface, whereas the other mechanism involves carboxylation of the surface.

The concept of producing spheres or beads by means of suspension polymerization techniques is well known in the prior art. An exemplary one of such processes is disclosed in U.S. Pat. No. 2,809,943, issued Oct. 15, 1957. However, it was found that when a material was added which is a solvent for the monomers, but acts as a precipitant for the resulting polymer, a novel form of bead was provided containing a network of microscopic channels. This discovery is set forth in U.S. Pat. No. 4,224,415, filed July 18, 1958, issuing some twenty-two years later on Sept. 23, 1980. In this patent, beads are produced ranging in size from about 350 to about 1200 microns. Typical monomers include divinyl toluene, diallyl maleate, and triallyl phosphate. The precipitant employed is said to be an alkane, acid ester, or alcohol.

This technology was expanded and the precipitant was variously described in the patent literature as a diluent, porogen, active ingredient, solvent, functional material, and volatile agent. For example, in U.S. Pat. No. Re. 27,026, issued Jan. 12, 1971, porous beads of a diameter less than ten microns are disclosed. Among the monomers used to produce the beads are ethyl methacrylate, divinyl benzene, and ethylene glycol dimethacrylate. In U.S. Pat. No. 3,418,262, issued Dec. 24, 1968, there is described a bead characterized as having a rigid sponge structure, and wherein the porogenic agent employed is an acid such as stearic acid. Beads ranging in size from 0.5 mm to 500 microns are disclosed. Intermediates in bead form were produced in U.S. Pat. No. 3,509,078, issued Apr. 28, 1970, using polymeric materials such as polyethylene glycols as the precipitant material during the in situ suspension polymerization process. The macroporous character of such bead construction is graphically portrayed and illustrated in FIG. 1 of U.S. Pat. No. 3,627,708, issued Dec. 14, 1971. Beads termed "pearls" are produced, and containing active ingredients therein such as water or various alcohol ethers. The pearls are crosslinked to the extent of about twenty percent. In U.S. Pat. No. 3,637,535, issued Jan. 25, 1972, beads with a sponge structure are said to be capable of being compressed to an imperceptible powder. These beads are capable of being loaded with as much as 200–300% of active ingredients such as white spirit, and benzin. A rigid porous bead of a trifunctional methacrylate is taught in U.S. Pat. No. 3,767,600, issued Oct. 23, 1973. Such beads have a size of 10–900 microns, and various other monomers which can be employed include diacetone acrylamide, and ethylhexyl, hydroxyethyl, and hydroxypropyl methacrylates. Paraffin wax in an amount of 5–100% is used to form the microscopic network of channels in U.S. Pat. No. 3,989,649, issued Nov. 2, 1976. The wax may be removed from the bead structure by solvent extraction.

While many of the foregoing U.S. patents relate to ion exchange technology, a bead similar to those previously described is employed as a carrier for enzymes in U.S. Pat. No. 4,208,309, issued June 17, 1980. Such beads are of the size of about 0.1 mm. U.S. Pat. No. 4,661,327, issued Apr. 28, 1987, describes a macroreticular bead containing a magnetic core. The use of hard crosslinked porous polymeric beads in cosmetics as carriers is taught in U.S. Pat. No. 4,724,240, issued Feb. 9, 1988, wherein various emollients and moisturizers are entrapped therein. These beads are said to be capable of entrapping materials such as 2-ethylhexyl oxystearate, arachidyl propionate, petroleum jelly, mineral oil, lanolin, and various siloxanes. The size of the beads ranges from 1–3,000 microns. Typical monomers include ethylene glycol dimethacrylate, lauryl methacrylate, trimethylol propane trimethacrylate, and dipentaerythritol dimethacrylate. Hydrophobic powders and beads may be produced in accordance with the teaching of this patent. Beads having a rigid sponge structure are also described in U.S. Pat. No. 4,690,825, issued Sept. 1, 1987, and wherein the beads function as a delivery vehicle for a host of materials including pigments, vitamins, fragrances, drugs, repellants, detergents, and sunscreens. The beads have a size of 10–100 microns and are preferably of a monomer system of styrene-divinyl benzene. Crosslinking is said to range from 10–40 percent.

The foreign patent literature includes West German Offenlegungsschrift No. P-2608533.6, published Sept. 30, 1976, and wherein porous polymeric beads produced by suspension polymerization are provided, and which are adapted to release perfumes. A controlled release of the fragrance is disclosed, providing utility for such beads in the home, automobiles, airplanes, railway cars, hospitals, classrooms, conference centers, and gymnasiums. Canadian Pat. No. 1,168,157, issued May 29, 1984, describes hard, discrete, free flowing, bead constructions in which the beads entrap a series of functional materials which can be incorporated into toilet soap, body powder, and antiperspirant sticks. The Canadian Patent, it is noted, is the equivalent of European Pat. No. 61,701, issued on July 16, 1986. In European International Publication No. 0252463A2, published Jan. 13, 1988, there is disclosed a bead having a hydrophobic polymer lattice, and which entraps numerous non-cosmetic materials such as pesticides, pharmaceuticals, pheromones, and various categories of chemicals. Steroids are entrapped, for example, in the porous beads of PCT International Publication No. WO-88/01164, published on Feb. 25, 1988. The steroids are adrenocortical steroids or various anti-inflammatory type steroids. It should therefore be apparent that what began as a simple ion exchange bead concept has rapidly grown into a technology of widely varied application.

In accordance with the present invention, polymer lattices are produced by novel processes not believed to be taught in the prior art, as exemplified by the foregoing patents. Those patents, in general, relate to suspension polymerization processes for the production of porous polymeric and copolymeric spheres and beads in which the precipitant is present during polymerization. These are defined as an "in situ" process. For example, U.S. Pat. No. 4,724,240, while disclosing beads and spheres produced by suspension polymerization techniques in one embodiment, also describes a process involving precipitation polymerization technology, and in which there is produced powder-like materials, in contrast to beads. The PCT International Publication, while a suspension polymerization system, can also be defined as a "post adsorption" process in its use. In this variance, a volatile porogen is polymerized "in situ" and removed by extraction and evaporation, resulting in empty beads. The beads can be loaded with diverse active ingredients, as desired, at subsequent times. Post adsorption techniques are considered to be more attractive because of the flexibility in the selection of active ingredients that can be subsequently entrapped, whereas in the conventional "in situ" suspension systems, the porogen polymerized "in situ" remains in the final product.

What has been accomplished in the present invention, however, is a unique concept differing from all of the foregoing methods, and wherein hydrophilic post adsorbent powders are produced. In contrast to the post adsorbent materials heretofore known in the prior art, hydrophobic powders are treated in order to render the surfaces hydrophilic, thus rendering the powders of the present invention capable of adsorbing liquids having a high surface tension such as formamide, glycerol, and water. The powders of the prior art have traditionally only been capable of adsorbing low surface tension liquids such as hexadecane, dioctylphthalate, bromonaphthalene, ethylene glycol, and methyl iodide. For purposes of the present invention, high surface tension liquids are defined as those liquids having a surface tension generally in excess of about fifty-eight $mNm^{-1}$.

SUMMARY OF THE INVENTION

This invention relates to methods for altering a macroporous cross-linked hydrophobic copolymeric lattice, produced by precipitation polymerization in a solvent of at least one monounsaturated ester monomer and at least one polyunsaturated ester monomer soluble therein, in order to render the hydrophobic copolymeric lattice hydrophilic. One method involves saponifying the hydrophobic copolymeric lattice by reacting the surface of the hydrophobic copolymeric lattice with an aqueous alkali. Another method involves polymerizing a hydrophilic acrylate monomer onto the surface of the hydrophobic copolymeric lattice in order to form carboxylic acid sites on the surface of the hydrophobic copolymeric lattice. The hydrophilic carboxylic acid sites may also be converted to more hydrophilic carboxylate anions.

With either method, the copolymer is in the form of a powder, and the powder is a combined system of particles which can be defined as a lattice. The system of powder particles includes unit particles of less than about one micron in diameter, agglomerates of fused unit particles of sizes in the range of about twenty to eighty microns in diameter, and aggregates of clusters of fused agglomerates of sizes in the range of about two hundred to about twelve hundred microns in diameter.

In one preferred embodiment of the present invention, the monounsaturated ester monomer is lauryl methacrylate, the polyunsaturated ester monomer is ethylene glycol dimethacrylate, and the solvent is isopropyl alcohol. In the first mentioned method, the saponification is carried out with an alkali such as sodium hydroxide, potassium hydroxide, and quaternary ammonium hydroxides, dissolved in aqueous alcohol. In the second method, the acrylate monomer which is polymerized on the surface of the hydrophobic lattice can be either acrylic acid or methacrylic acid. The resulting surface polymerized carboxylic acid sites may be converted to carboxylate anions by reacting the surface containing the carboxylic acid sites with an aqueous alkali. The aqueous alkali is preferably sodium hydroxide, potassium hydroxide, or a quaternary ammonium hydroxide. The present invention also relates to hydrophilic macroporous cross-linked copolymers produced by either of the aforementioned methods.

These and other objects, features, and advantages, of the present invention will become apparent when considered in light of the following detailed description.

DETAILED DESCRIPTION OF THE INVENTION

The hydrophobic material which is surface treated in accordance with the present invention, and which functions as the basic starting material, has been employed as a carrier for active ingredients, and can be broadly and generally described as a highly crosslinked hydrophobic polymer lattice. These materials are adapted to have entrapped and dispersed throughout and within the lattice, an active ingredient which may be in the form of a solid, liquid, or gas. The lattice is in particulate form and constitutes free flowing discrete solid particles even when loaded with an active material. When loaded, the lattice may contain a predetermined quantity of the active material. The polymer has the structural formula:

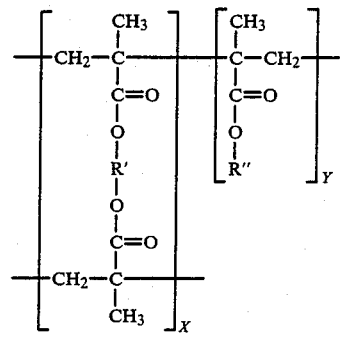

where the ratio of x to y is 80:20, R' is —$CH_2CH_2$—, and R" is —$(CH_2)_{11}CH_3$.

The hydrophobic polymer is a highly crosslinked polymer, as evidenced by the foregoing structural formula, and is more particularly a highly crosslinked polymethacrylate copolymer. This hydrophobic material is manufactured by the Dow Corning Corporation, Midland, Mich., U.S.A., and sold under the trademark POLYTRAP®. It is a low density, highly porous, free-flowing white particulate, and the particles are capable of adsorbing high levels of lipophilic liquids and some hydrophilic liquids, while at the same time maintaining a free-flowing particulate character.

In the powder form, the structure of the hydrophobic particulate is complex, and consists of unit particles less than one micron in diameter. The unit particles are fused into agglomerates of twenty to eighty microns in diameter. These agglomerates are loosely clustered into macro-particles termed "aggregates" of about 200 to about 1200 microns in diameter.

The following example illustrates one method for making a post adsorbed hydrophobic particulate polymeric powder suitable for use as the basic starting material for alteration by the surface treatment of the present invention. The hydrophobic powder produced in accordance with Example I is treated hereinafter to render the hydrophobic powder hydrophilic, as will be seen in Examples II-IV.

EXAMPLE I

A post adsorbed hydrophobic porous polymeric powder using the precipitation polymerization technique was produced by mixing in a five hundred milliliter polymerization reactor equipped with a paddle type stirrer, 13.63 grams of ethylene glycol dimethacrylate, or eighty mole percent, and 4.37 grams of lauryl methacrylate, or twenty mole percent. Isopropyl alcohol was added to the reactor in the amount of 282 grams. The monomers were soluble in the isopropyl alcohol solvent, but not the precipitated polymer. Other solvents that can be employed are toluene, cyclohexane, or heptane. The mixture including 0.36 grams of catalytic initiator benzoyl peroxide, was purged with nitrogen. The system was heated by a water bath to about sixty degrees Centigrade until polymerization was initiated, at which time, the temperature was increased to about 70-75 degrees Centigrade for six hours, in order to complete the polymerization. During this time, the polymer precipitated from the solution. The polymerization produced unit particles of a diameter less than about one micron. Some of the unit particles adhered together providing agglomerates of the order of magnitude of about twenty to eighty microns in diameter. Some of the agglomerates adhered further and were fused and welded one to another, forming aggregates of loosely held assemblies of agglomerates of the order of magnitude of about two to eight hundred microns in diameter. The mixture was filtered to remove excess solvent, and a wet powder cake was tray dried in a vacuum oven. A dry powder consisting of unit particles, agglomerates, and aggregates was isolated. A portion of this hydrophobic powder was surface treated in order to render the powder hydrophilic in accordance with one of the procedures of Example II or Examples III-IV which are set forth below.

It is important to understand that the method of Example I for the production of hydrophobic porous copolymeric particulate powder materials is characterized as a precipitation polymerization technique. In accordance with this technique, monomers are dissolved in a compatible solvent in which the monomers are soluble, such as isopropyl alcohol. Polymer in the form of a powder is precipitated and the polymer is insoluble in the solvent. No surfactant or dispersing aid is required. The materials produced are powders and not spheres or beads. The powder particulates include unit particles, agglomerates, and aggregates. The solvent is subsequently driven off resulting in an empty powder particulate, adapted to be post adsorbed with a variety of other types of functional active ingredients. The "in situ" suspension polymerization process on the other hand, provides that polymerization be carried out in water and wherein the phase including the monomers, the active, and the catalyst, form beads or droplets, and that the polymerization occur within each bead. The monomers and the active are insoluble in the water suspending phase. A surfactant or stabilizer is required in order to prevent the individually formed beads and droplets from coalescing. The resulting beads, with the active material entrapped therein, include a substantially spherical outer crust or shell, the interior of which contains a macroporous structure. The bead is generally of the order of about ten to one hundred microns in diameter and can be as large as one hundred-fifty microns, depending upon the rate of agitation employed during the process.

In order to demonstrate the methods of the present invention, Examples II-IV are set forth hereinafter, in which the hydrophobic powder material produced in Example I, was surface treated in order to render the hydrophobic powder hydrophilic. A first method is shown in Example II. A second method is set forth in Example III. Example IV describes an additional step that may be included in the method of Example III. References to hydrophobic powder in Examples II-IV refers to the powder material produced in accordance to a process exemplified by Example I.

EXAMPLE II 5.0 grams of hydrophobic powder was refluxed and stirred with 10.0 grams of NaOH, 150 cc of butyl alcohol, and 15 cc of water. After reflux for 4.5 hours, the product was filtered and washed four times with 100 cc of 1:1 isopropyl alcohol and water, once with butyl alcohol, and once again with isopropyl alcohol. The powder was vacuum dried to constant weight. Scanning electron microscopic photomicrographs of the treated powder showed no visible change in aggregate structure compared to untreated powder. Electron spectroscopic analysis (ESCA) showed 6 atom % Na at the surface of the powder. Attenuated total reflectance infrared radiation analysis indicated the presence of carboxylate ion (1590 cm$^{-1}$) in the treated powder.

The treated powder was easily wetted by water and produced a viscous paste upon minimal mixing. By comparison, untreated powder was completely non-wetted by water.

EXAMPLE III 2.5 grams of methacrylic acid was added to 25.0 grams of hydrophobic powder that had been suspended in a mixture of 100 cc toluene, 400 cc heptane, and 0.275 grams 1,1'-azobiscyclohexanecarbonitrile. The mixture was flushed with N$_2$ and heated at reflux (104° C.) for 4 hours. The product was filtered, washed with isopropyl alcohol, and dried under vacuum to a constant weight.

Scanning electron microscopic photomicrographs of the powder showed no apparent change in aggregate structure. Electron spectroscopic analysis (ESCA) showed an enrichment of oxygen (26.4 atom % O) at the surface of the powder compared to untreated powder (20.0 atom % O). The product was wettable by water.

EXAMPLE IV 5.0 grams of product from Example III was mixed with 2.0 grams NaOH dissolved in a mixture of 200 cc isopropyl alcohol and 50 cc water. The mixture was stirred for 10 minutes at 65° C. The powder was recovered by filtration, washed twice with 300 cc 1:1 isopropyl alcohol H$_2$O, and dried under vacuum to a constant weight. Electron spectroscopic analysis (ESCA) showed the presence of 3.4 atom % Na on the surface of the powder. The powder was highly adsorbent toward water.

Test data showing the hydrophilic nature of the materials produced by the methods of Examples II-IV are set forth in Table I. It should be apparent from Table I that the powder materials produced by both the method of Example II and the method of Examples III-IV are capable of adsorbing water, in contrast to the hydrophobic powder of Example I.

Free flowing adsorption capacity was determined by addition of incremental amounts of liquid to a known amount of powder, using gentle mixing, until the powder was no longer free flowing. The capacity was expressed as:

$$\frac{(\text{wt. Powder} + \text{Liquid}) - (\text{Initial wt. of Powder})}{(\text{wt. Powder} + \text{Liquid})} \times 100$$

TABLE I

| Sample | Free Flow Capacity (%) | | | |
| --- | --- | --- | --- | --- |
|  | $H_2O$ | Mineral Oil | Ester* | Silicone* |
| Untreated Powder Control | 0 | 77.3 | 78.3 | 78.3 |
| Powder of Example II Saponified With NaOH | 69.8 | 50.4 | 51.2 | 56.0 |
| Powder of Example III | 74.5 | 75.6 | 72.3 | 76.9 |
| Powder of Example IV | 73.0 | 72.3 | 73.0 | 76.2 |

*2-ethylhexyl oxstearate
**Octamethylcyclotetrasiloxane

The water adsorbing porous polymeric materials of the present invention are to be contrasted with the water containing beads of U.S. Pat. No. 3,627,708, issued Dec. 14, 1971. The bead of the '708 patent is produced by "in situ" suspension polymerization, and is adapted to contain water only because of the presence of a solubilizer such as sodium bis(2-ethyl hexyl) sulfosuccinate. The material of the present invention, on the other hand, is produced by a precipitation polymerization process, which contains no solubilizer, and produces a material in the form of a powder consisting of unit particles, agglomerates, and aggregates. Thus, the materials of the present invention are very distinct from the materials of the '708 patent. The materials of the present invention are of general utility, and may be used in any situation requiring the adsorption of aqueous systems.

It will be apparent from the foregoing that many other variations and modifications may be made in the structures, compounds, compositions, and methods described herein without departing substantially from the essential features and concepts of the present invention. Accordingly, it should be clearly understood that the forms of the invention described herein are exemplary only and are not intended as limitations on the scope of the present invention.

That which is claimed is:

1. A method for altering a macroporous highly cross-linked hydrophobic copolymer, produced by precipitation polymerization in a solvent of at least one monounsaturated ester monomer and at least one polyunsaturated ester monomer soluble therein, in order to render the hydrophobic copolymer hydrophilic, comprising polymerizing an acrylate monomer on the surface of the hydrophobic copolymer in order to form carboxylic acid sites on the surface of the hydrophobic copolymer.

2. The method of claim 1 including the step of converting the carboxylic acid sites formed on the surface of the copolymer to carboxylate anions.

3. The method of claim 2 wherein the acrylate monomer is selected from the group consisting of acrylic acid and methacrylic acid.

4. The method of claim 2 wherein the carboxylic acid sites are converted to carboxylate anions by reacting the surface containing the carboxylic acid sites with an aqueous alkali.

5. The method of claim 4 wherein the aqueous alkali is selected from the group consisting of sodium hydroxide, potassium hydroxide, and quaternary ammonium hydroxides.

6. The process of claim 5 wherein the monounsaturated monomer is lauryl methacrylate.

7. The process of claim 6 wherein the polyunsaturated monomer is ethylene glycol dimethacrylate.

8. The process of claim 7 wherein the solvent is isopropyl alcohol.

9. The process of claim 1 in which the copolymer is in the form of a powder, the powder being a combined system of particles, the system of powder particles including unit particles of less than about one micron in average diameter, agglomerates of fused unit particles of sizes in the range of about twenty to eighty microns in average diameter, and aggregates of clusters of fused agglomerates of sizes in the range of about two hundred to about twelve hundred microns in average diameter.

10. The process of claim 9 wherein the copolymer is formed of a highly cross-linked polymethacrylate copolymer.

11. A method for altering the surface of a macroporous cross-linked hydrophobic copolymer comprising producing a macroporous highly cross-linked hydrophobic copolymer by precipitation polymerization in a solvent of at least one monounsaturated ester monomer and at least one polyunsaturated ester monomer soluble therein, and polymerizing an acrylate monomer on the surface of the hydrophobic copolymer to form carboxylic acid sites on the surface of the hydrophobic copolymer, in order to render the hydrophobic copolymer hydrophilic.

* * * * *